United States Patent Office 3,431,305
Patented Mar. 4, 1969

3,431,305
PROCESS FOR THE PRODUCTION OF 2-(PROPENYL)-2-CYCLOHEXENONE
Benjamin Thompson and Thomas E. Buckner, Kingsport, Tenn., assignors to Eastman Kodak Company, Rochester, N.Y., a corporation of New Jersey
No Drawing. Filed Feb. 8, 1965, Ser. No. 431,191
U.S. Cl. 260—586　　2 Claims
Int. Cl. C07c 45/00

This invention relates to novel chemical compounds and more particularly to novel aliphatic 2-substituted carbocyclic ketones and their preparation from acetylenic alcohols and aliphatic carbocyclic ketones.

The aliphatic 2-substituted carbocyclic ketones of our invention are aliphatic 2-allylidene carbocyclic ketones of the formula:

(I)

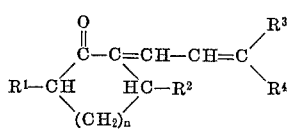

and aliphatic 2-propenyl carbocyclic ketones of the formula:

(II)

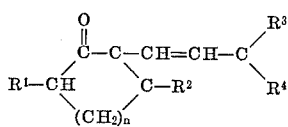

wherein $n$ is an integer from 0 to 8; each of $R^1$ and $R^2$, when taken singly, is hydrogen; $R^1$ and $R^2$, when taken collectively, represent an alkylene group having 1 to 2 carbon atoms, $R^3$ and $R^4$, when taken singly, are hydrogen or alkyl of 1 to 8 carbon atoms; and $R^3$ and $R^4$, when taken collectively with the carbon atom to which they are attached, represent a saturated carbocyclic ring having 4 to 8 ring carbon atoms.

The compounds of Formula I, above, are substituted cyclobutanones, cyclopentanones, cyclohexanones, cycloheptanones, cyclooctanones, cyclononanones, cyclodecanones, cycloundecanones, cyclododecanones or bicyclic derivatives of such aliphatic carbocyclic ketones containing a methylene or ethylene bridge.

The compounds of the Formula II, above, are substituted 2 - cyclobutenones, 2-cyclopentenones, 2-cyclohexenones, 2 - cycloheptenones, 2 - cyclooctenones, 2-cyclononenones, 2-cyclodecenones, 2-cycloundecenones, 2-cyclododecenones or bicyclic derivatives of such aliphatic unsaturated carbocyclic ketones containing a methylene or ethylene bridge.

The substituents $R^3$ and $R^4$, when taken singly, are typically hydrogen or alkyl of 1 to about 8 carbon atoms and preferably hydrogen or lower alkyl such as methyl, ethyl, propyl, butyl, isobutyl, tert-butyl, sec-butyl, etc. $R^3$ and $R^4$, when taken collectively with the carbon atom to which they are attached, represent a saturated carbocyclic ring of 4 to 8 ring carbon atoms. Thus, in Formula I, the saturated carbocyclic rings represented by $R^3$ and $R^4$, when taken collectively with the carbon atom to which they are attached, are typically cyclobutylidene, cyclopentylidene, cyclohexylidene, cycloheptylidene or cyclooctylidene and the corresponding carbocyclic rings of Formula II are cyclobutyl, cyclopentyl, cyclohexyl, cycloheptyl or cyclooctyl.

Examples of the aliphatic 2-allylidene carbocyclic ketones of our invention includes compounds such as:

2-allylidenecyclobutanone;
2-allylidenecyclopentanone;
2-allylidenecyclohexanone;
2-allylidenecycloheptanone;
2-allylidenecyclooctanone;
2-(2-butenylidene)cyclobutanone;
2-(2-butenylidene)cyclopentanone;
2-(2-butenylidene)cyclohexanone;
2-(2-butenylidene)cycloheptanone;
2-(2-butenylidene)cyclooctanone;
2-(3-methyl-2-butenylidene)cyclobutanone;
2-(3-methyl-2-butenylidene)cyclopentanone;
2-(3-methyl-2-butenylidene)cyclohexanone;
2-(3-methyl-2-butenylidene)cycloheptanone;
2-(3-methyl-2-butenylidene)cyclooctanone;
2-(2-heptenylidene)cyclobutanone;
2-(2-heptenylidene)cyclopentanone;
2-(2-heptenylidene)cyclohexanone;
2-(2-heptenylidene)cycloheptanone;
2-(2-heptenylidene)cyclooctanone;
2-(3-butyl-2-heptenylidene)cyclobutanone;
2-(3-butyl-2-heptenylidene)cyclopentanone;
2-(3-butyl-2-heptenylidene)cyclohexanone;
2-(3-butyl-2-heptenylidene)cycloheptanone;
2-(3-butyl-2-heptenylidene)cyclooctanone;
2-(2-cyclobutylideneethylidene)cyclobutanone;
2-(2-cyclobutylideneethylidene)cyclopentanone;
2-(2-cyclobutylideneethylidene)cyclohexanone;
2-(2-cyclobutylideneethylidene)cycloheptanone;
2-(2-cyclobutylideneethylidene)cyclooctanone;
2-(2-cyclopentylideneethylidene)cyclobutanone;
2-(2-cyclopentylideneethylidene)cyclopentanone;
2-(2-cyclopentylideneethylidene)cyclohexanone;
2-(2-cyclopentylideneethylidene)cycloheptanone;
2-(2-cyclopentylideneethylidene)cyclooctanone;
2-(2-cyclohexylideneethylidene)cyclobutanone;
2-(2-cyclohexylideneethylidene)cyclopentanone;
2-(2-cyclohexylideneethylidene)cyclohexanone;
2-(2-cyclohexylideneethylidene)cycloheptanone;
2-(2-cyclohexylideneethylidene)cyclooctanone;
2-(2-cycloheptylideneethylidene)cyclobutanone;
2-(2-cycloheptylideneethylidene)cyclopentanone;
2-(2-cycloheptylideneethylidene)cyclohexanone;
2-(2-cycloheptylideneethylidene)cycloheptanone;
2-(2-cycloheptylideneethylidene)cyclooctanone;
3-allylidenebicyclo[2.1.0]pentan-2-one;
3-(2-butenylidene)bicyclo[2.1.1]hexan-2-one;
3-(3-methyl-2-butenylidene)bicyclo[2.2.1]heptan-2-one;
3-allylidenebicyclo[2.2.1]heptan-2-one;
7-(2-heptenylidene)bicyclo[3.2.1]octan-6-one;
7-(3-butyl-2-heptenylidene)bicyclo[3.2.2]nonan-6-one;
9-(2-cyclobutylideneethylidene)bicyclo[5.2.1]nonan-8-one;
9-allylidenebicyclo[5.2.2]undecan-8-one;
11-allylidenebicyclo[7.2.1]dodecan-10-one;
12-allylidenebicyclo[8.2.2]tetradecan-11-one.

Examples of the aliphatic 2-propenyl carbocyclic ketones of our invention include compounds such as:

2-(propenyl)-2-cyclobutenone;
2-(propenyl)-2-cyclopentenone;
2-(propenyl)-2-cyclohexenone;
2-(propenyl)-2-cycloheptenone;
2-(propenyl)-2-cyclooctenone;
2-(1-butenyl)-2-cyclobutenone;
2-(1-butenyl)-2-cyclopentenone;
2-(1-butenyl)-2-cyclohexenone;
2-(1-butenyl)-2-cycloheptenone;
2-(1-butenyl)-2-cyclooctenone;
2-(3-methyl-1-butenyl)-2-cyclobutenone;
2-(3-methyl-1-butenyl)-2-cyclopentenone;
2-(3-methyl-1-butenyl)-2-cyclohexenone;
2-(3-methyl-1-butenyl)-2-cycloheptenone;

2-(3-methyl-1-butenyl)-2-cyclooctenone;
2-(1-heptenyl)-2-cyclobutenone;
2-(1-heptenyl)-2-cyclopentenone;
2-(1-heptenyl)-2-cyclohexenone;
2-(1-heptenyl)-2-cycloheptenone;
2-(1-heptenyl)-2-cyclooctenone;
2-(3-butyl-1-heptenyl)-2-cyclobutenone;
2-(3-butyl-1-heptenyl)-2-cyclopentenone;
2-(3-butyl-1-heptenyl)-2-cyclohexenone;
2-(3-butyl-1-heptenyl)-2-cycloheptenone;
2-(3-butyl-1-heptenyl)-2-cyclooctenone;
2-(2-cyclobutylvinyl)-2-cyclobutenone;
2-(2-cyclobutylvinyl)-2-cyclopentenone;
2-(2-cyclobutylvinyl)-2-cyclohexenone;
2-(2-cyclobutylvinyl)-2-cycloheptenone;
2-(2-cyclobutylvinyl)-2-cyclooctenone;
2-(2-cyclopentylvinyl)-2-cyclobutenone;
2-(2-cyclopentylvinyl)-2-cyclopentenone;
2-(2-cyclopentylvinyl)-2-cyclohexenone;
2-(2-cyclopentylvinyl)-2-cycloheptenone;
2-(2-cyclopentylvinyl)-2-cyclooctenone;
2-(2-cyclohexylvinyl)-2-cyclobutenone;
2-(2-cyclohexylvinyl)-2-cyclopentenone;
2-(2-cyclohexylvinyl)-2-cyclohexenone;
2-(2-cyclohexylvinyl)-2-cycloheptenone;
2-(2-cyclohexylvinyl)-2-cyclooctenone;
2-(2-cycloheptylvinyl)-2-cyclobutenone;
2-(2-cycloheptylvinyl)-2-cyclopentenone;
2-(2-cycloheptylvinyl)-2-cyclohexenone;
2-(2-cycloheptylvinyl)-2-cycloheptenone;
2-(2-cycloheptylvinyl)-2-cyclooctenone;
7-(propenyl)bicyclo[4.2.1]non-6-en-8-one;
7-(7-cyclohexylvinyl)bicyclo[4.2.2]dec-6-en-8-one;
9-(propenyl)bicyclo[6.2.1]undec-8-en-10-one;
9-(3-methyl-1-butenyl)bicyclo[6.2.2]dodec-8-en-10-one;
11-(1-butenyl)bicyclo[8.2.1]tridec-10-en-12-one;
11-(propenyl)bicyclo[9.2.2]tetradec-10-en-12-one;
2-(propenyl)bicyclo[2.2.0]hex-1-en-3-one;
2-(propenyl)bicyclo[2.2.1]hept-1-en-3-one;
2-(propenyl)bicyclo[2.2.2]oct-1-en-3-one.

The novel compounds of our invention are prepared by contacting an acetylenic alcohol with an aliphatic carbocyclic keone in the presence of an acidic catalyst.

The acetylenic alcohols useful in the process of our invention can be represented by the formula:

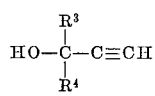

in which $R^3$ and $R^4$ have the meanings previously assigned. Examples of the useful acetylenic alcohols include compounds such as:

propargyl alcohol;
1-butyn-3-ol;
1-pentyn-3-ol;
1-hexyn-3-ol;
1-heptyn-3-ol;
3-methyl-1-butyn-3-ol;
3-methyl-1-pentyn-3-ol;
3-methyl-1-hexyn-3-ol;
3-methyl-1-heptyn-3-ol;
3-ethyl-1-pentyn-3-ol;
3-ethyl-1-hexyn-3-ol;
3-ethyl-1-heptyn-3-ol;
3-propyl-1-hexyn-3-ol;
3-propyl-1-heptyn-3-ol;
3-butyl-1-heptyn-3-ol;
1-ethynylcyclobutanol;
1-ethynylcyclopentanol;
1-ethynylcyclohexanol;
1-ethynylcycloheptanol; etc.

The aliphatic carbocyclic ketones useful in the process of our invention can be represented by the formula:

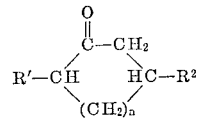

wherein $R^1$ and $R^2$ have the meanings previously assigned. Examples of the useful aliphatic carbocyclic ketones include compounds such as:

cyclobutanone;
cyclopentanone;
cyclohexanone;
cycloheptanone;
cyclooctanone;
cyclononanone;
cyclodecanone;
cycloundecanone;
cyclododecanone;
bicyclo[2.1.0]pentan-2-one;
bicyclo[2.2.0]hexan-2-one;
bicyclo[2.1.1]hexan-2-one;
bicyclo[2.2.1]heptan-2-one;
bicyclo[2.2.2]octan-2-one;
bicyclo[3.2.1]octan-6-one;
bicyclo[3.2.2]nonan-6-one;
bicyclo[4.2.1]nonan-7-one;
bicyclo[4.2.2]decan-7-one;
bicyclo[5.2.1]decan-8-one;
bicyclo[5.2.2]undecan-8-one;
bicyclo[6.2.1]undecan-9-one;
bicyclo[6.2.2]dodecan-9-one;
bicyclo[7.2.1]dodecan-10-one;
bicyclo[7.2.2]tridecan-10-one;
bicyclo[8.2.1]tridecan-11-one;
bicyclo[8.2.2]tetradecan-11-one; etc.

The process of our invention is preferably carried out by heating a mixture containing the acetylenic alcohol and the aliphatic carbocyclic ketone in the presence of the acidic catalyst. The reaction can be carried with equimolar amounts of the acetylenic alcohol and the aliphatic carbocyclic ketone or with a molar excess of either the acetylenic alcohol or the aliphatic carbocyclic ketone. However, it is preferred to use an excess of the aliphatic carbocyclic ketone.

The reaction is catalyzed by virtually any type of acidic material. Examples of suitable catalysts include aromatic sulfonic acids such as p-toluene sulfonic acid, o-toluene sulfonic acid, m-toluene sulfonic acid, benzene sulfonic acid, etc.; mineral acids such as phosphoric acid, sulfuric acid, hydrochloric acid, etc.; Lewis acids such as boron trifluoride, etc.; aliphatic sulfonic acids such as methionic acid, etc.; and other acidic materials such as acidic ion exchange resins, etc. Strong acids, such as those listed above, are preferred as the acidic catalysts for use in the process of our invention.

The reaction is preferably carried out in an inert solvent. Suitable solvents are those which dissolve the reactants but which do not react with the reactants. Examples of useful solvents include benzene, p-xylene, diisopropyl ketone, diphenyl ether, cymene, etc. Preferred as inert solvents are those in which water is substantially insoluble.

The reaction can be carried out at atmospheric, subatmospheric or superatmospheric pressures. Atmospheric pressure is preferred for reasons of convenience.

Preferred reaction temperatures are from about 80° C. to about 200° C. A particularly convenient method for carrying out the process of our invention is to heat the reaction mixture comprising the aliphatic carbocyclic ketone, the acetylenic alcohol, the acidic catalyst and the inert solvent under reflux.

The following example illustrates our invention.

EXAMPLE

A solution containing 3920 g. of cyclohexanone, 1120 g. of propargyl alcohol, 10 g. of hydroquinone, 0.5 g. of methionic acid, and 510 g. of p-xylene was heated in a reaction still having means for removing water at the still-head. Enough benzene, 120 g., was added to the reaction mixture to aid in the separation of water at the still-head. The mixture was heated for about thirteen and a half hours during which time about 370 cubic centimeters of water containing some propargyl alcohol was removed at the still-head.

The crude product was removed from the reaction still and stripped in a flash still to remove unreacted feed materials. The ratio of ketone to alcohol in the unreacted feed materials was adjusted to 2 moles ketone to 1 mole of alcohol and the reaction was repeated with the unreacted feed materials.

The higher boiling products from each of the reactions were fractionated to separate 2-(propenyl)-2-cyclohexenone, B.P. 63–65° C. at 2.0 mm., $n_D^{20}$ 1.5179. Elemental analysis confirmed the formula $C_9H_{12}O$. Infrared and nuclear magnetic resonance analysis confirmed the structure of the major portion of the reaction product to be 2-(propenyl)-2-cyclohexenone, B.P. 63° C. at 2.0 mm., $n_D^{20}$ 1.5179. Another fraction having the same elemental analysis was shown to be 2-allylidenecyclohexanone, $n_D^{20}$ 1.5260–80.

The new carbocyclic ketones of our invention are useful intermediates in organic syntheses. For example, they can be hydrogenated in the presence of platinum, palladium, copper chromite, or other hydrogenation catalysts to give the corresponding saturated carbocyclic alcohols which can then be esterfied with a dicarboxylic acid, e.g., phthalic acid, by conventional means to form diesters which are useful plasticizers for poly(vinyl chloride) resins.

The unsaturated carbocyclic ketones of our invention can be hydrated, e.g., in the presence of phosphoric acid or sulfuric acid, and then hydrogenated in the presence of a hydrogenation catalyst to yield diols and triols which are useful in the preparation of linear or cross-linked polyesters.

The compounds of our invention are also useful as odor-imparting agents in the preparation of perfumes and other scented compositions. For example, they can be incorporated in milled soap in a concentration of from about 0.5 to about 2 weight percent to give the soap a pleasant scent.

The aliphatic 2-allylidene carbocyclic ketones of our invention are useful for preparing the aliphatic 2-propenyl carbocyclic ketones of our invention because, under the reaction conditions described hereinbefore, the 2-allylidene carbocyclic ketones rearrange to yield the 2-propenyl carbocyclic ketones.

Although the invention has been described in considerable detail with particular reference to certain preferred embodiments thereof, variations and modifications can be effected within the spirit and scope of the invention as described hereinbefore and as defined in the appended claims.

We claim:
1. The process which comprises contacting cyclohexanone with propynyl alcohol in the presence of an acidic catalyst at a temperature of 70–200° C. and obtaining 2-(propenyl)-2-cyclohexenone.
2. The process of claim 1 wherein the catalyst is methionic acid.

References Cited

UNITED STATES PATENTS 3,225,102  12/1965  Thompson _____ 260—631 XR

FOREIGN PATENTS 237,413  1/1962  Australia.
804,089  11/1958  Great Britain.

OTHER REFERENCES

Cuvigny et al.: "Bull. Soc. Chim. France," Ser. 5, p. 520 (January to June 1960) QD1.54.

Conia et al.: "Compt. rend," vol. 250, pp. 3196 to 3197 (1960) Q46.A14.

Raphael et al.: "Adv. in. Org. Chem.," vol. 3, pp. 262 to 264 (1963) QD251.A3.

West et al.: "Synthetic Perfumes," p. 151 (1949) T.P. 983.W4.

LEON ZITVER, *Primary Examiner.*

M. M. JACOB, *Assistant Examiner.*

U.S. Cl. X.R.

167—94; 252—522